V. DOMKE.
AUTOMOBILE TIRE.
APPLICATION FILED FEB. 28, 1919.
1,313,800.
Patented Aug. 19, 1919.
2 SHEETS—SHEET 1.
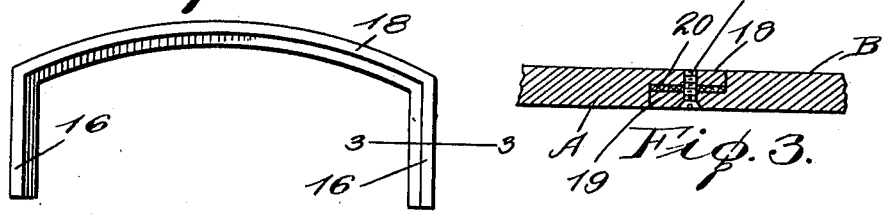
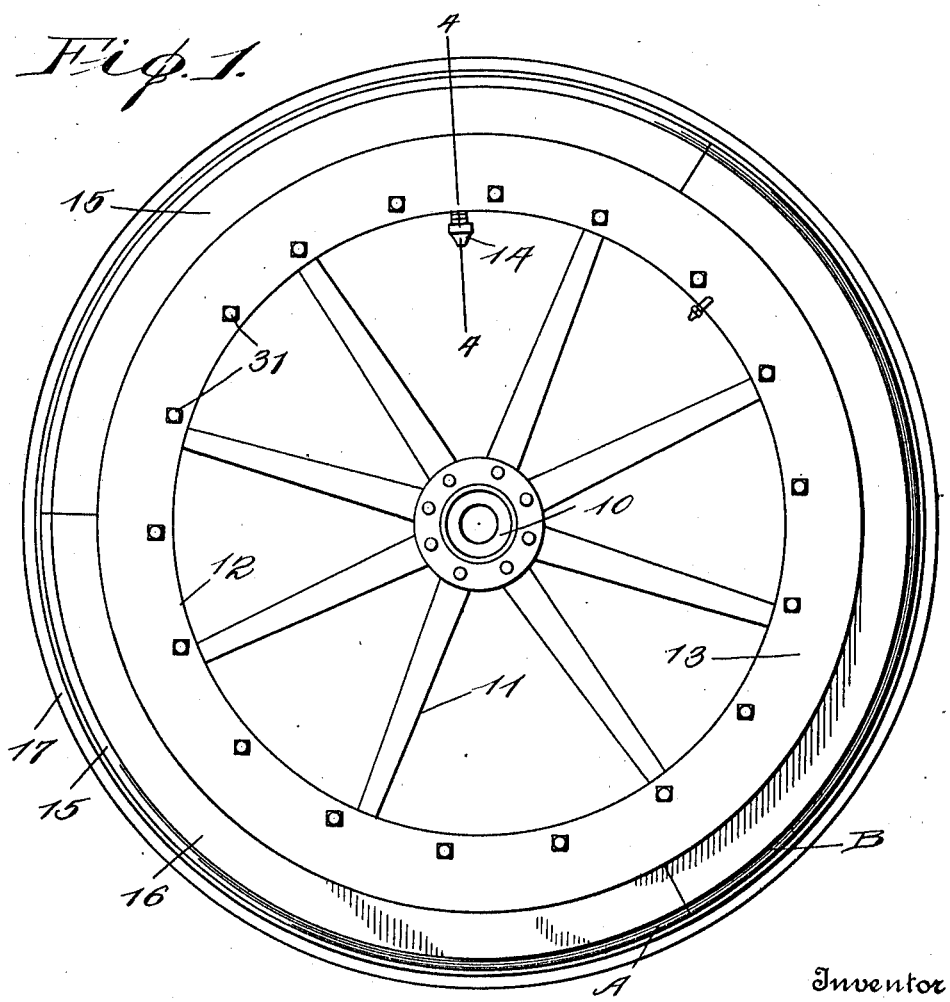

V. DOMKE.
AUTOMOBILE TIRE.
APPLICATION FILED FEB. 28, 1919.
1,313,800.
Patented Aug. 19, 1919.
2 SHEETS—SHEET 2.
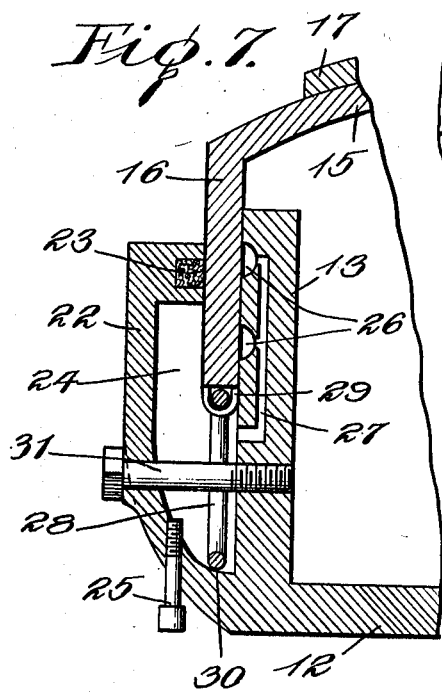
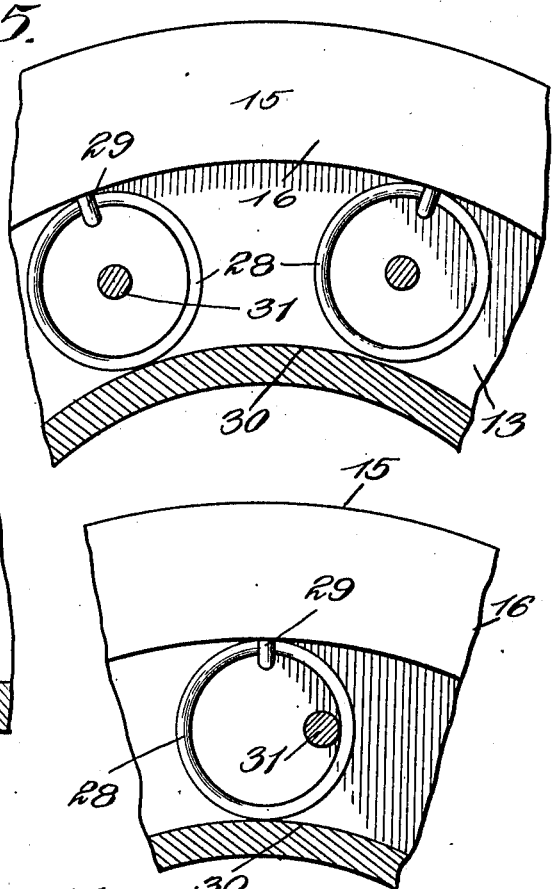
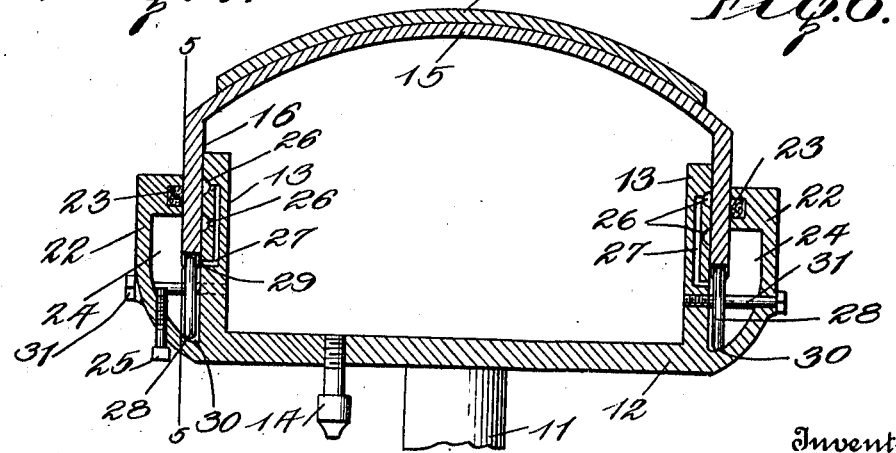
Inventor
Veron Domke
By
F. P. Gorin
Attorney

UNITED STATES PATENT OFFICE.

VERON DOMKE, OF BREMERTON, WASHINGTON.

AUTOMOBILE-TIRE.

1,313,800.  Specification of Letters Patent.  Patented Aug. 19, 1919.

Application filed February 28, 1919. Serial No. 279,856.

*To all whom it may concern:*

Be it known that I, VERON DOMKE, a citizen of the United States, residing at Bremerton, in the county of Kitsap and State of Washington, have invented certain new and useful Improvements in Automobile-Tires, of which the following is a specification.

My invention relates to resilient wheels, adapted for use upon automobiles or the like.

An important object of the invention is to provide a wheel of the above mentioned character which possesses the desired degree of resiliency and is strong and durable.

A further object of the invention is to provide a wheel of the above mentioned character having means for connecting the elements of the rim or tire, upon the starting of the vehicle, to avoid undue shocks or jars.

Other objects and advantages of the invention will be apparent during the course of the following description.

In the accompanying drawings forming a part of this specification and in which like numerals are employed to designate like parts throughout the same, Figure 1 is a side elevation of a wheel embodying my invention, Fig. 2 is an end elevation of the outer tire section, Fig. 3 is a detailed section taken on line 3—3 of Fig. 2, Fig. 4 is a transverse sectional view taken on line 4—4 of Fig. 1, Fig. 5 is a detailed section taken on line 5—5 of Fig. 4, Fig. 6 is a similar view showing the yielding connecting ring in the active position, and, Fig. 7 is a view similar to Fig. 4, upon an enlarged scale, with parts broken away.

In the drawings wherein for the purpose of illustration is shown a preferred embodiment of my invention, the numeral 10 designates the hub of the wheel, carrying spokes 11, to the outer end of which is rigidly secured an inner tire member 12, preferably formed of metal. This inner tire member is preferably approximately U-shaped in cross section and has annular sides or flanges 13, as shown. The inner tire member 12 is provided with an air inflating valve 14, of the usual type carried by the ordinary pneumatic tire.

The numeral 15 designates a co-acting outer tire member, which is approximately U-shaped in cross section and has annular sides or flanges 16, disposed outwardly of and slidably contacting with the sides 13, to form an airtight joint therewith. The outer tire member 15 has its tread portion suitably curved in cross section and this member is preferably formed of metal. A strip 17 formed of leather, rubber or the like, is secured to the tread portion of the outer member 15.

In order that the outer member 15 may be assembled upon the inner member 12, such outer member is constructed in a plurality of sections A, which have joints B. As shown in Fig. 3, one section A is equipped with an outer tongue 18, to engage an inner tongue 19 secured to the end of the adjacent section A, said tongues having packing 20 arranged therebetween for affording an airtight joint, and being connected by screws or rivets 21. Any other suitable form of joint may be employed.

Arranged upon the sides 13 and secured thereto by being soldered or brazed thereon are annular flanges 22, also receiving the inner ends of the sides 16. These flanges carry packing 23 slidably contacting with the sides 16 to form an oil-tight joint therewith. The flanges 22 afford annular chambers 24, adapted to receive oil through valve controlled inlets 25.

The sides 13 are provided upon their outer faces in contact with the sides 16, with annular grooves 26, in communication with ports 27, leading into the chambers 24 to receive oil therefrom and feed the same to the grooves 26. These grooves retain the contacting sides properly lubricated and effect a seal or air tight joint.

Arranged upon the edges of the sides 16 are suitably stiff and resilient rings 28, which are secured to these edges by staples 29 or the like, which permit of the slight turning or rolling movement of the rings upon the edges. The rings 28 are positioned within the flanges 22, and are adapted to contact with the inner inclined ends 30 thereof.

Bolts 31 or the like are secured to the sides 13 and pass through the rings 28, as shown.

The operation of the wheel is as follows:

Compressed air is supplied into the tire through the valve 14 from a pump or the like, in the usual manner. When the tire is inflated the outer tire member 15 is adapted to yield slightly with relation to the inner tire member, so that the tire functions as the ordinary pneumatic tire. When starting the vehicle, the inner tire member 12 is turned with relation to the outer tire member 15, until the bolts 31 contact with the rings 28, as shown in Fig. 6, at which time the outer and inner tire members will be yieldingly coupled together to turn as a unit. Should the air become exhausted from the tire, the rings 28 which are suitably resilient, by contacting with the inclined ends 30 will serve to support the sides 13 so that they will not contact with the tread portion of the outer tire member.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention what I claim is:

1. A wheel structure comprising a pair of overlapping annular members adapted to slide and move circumferentially one over the other, projections extending from one of said members, resilient rings interposed between the two members and encircling the projections, and means for guiding sliding movement of the two members.

2. A wheel structure comprising an inner annular member formed with parallel flanges and lateral flanges open at their outer ends, an outer annular member provided with parallel flanges which fit over and slide on the parallel flanges of the inner member and extend through the openings in the outer ends of the lateral flanges, packing between the lateral flanges and the flanges of the outer member, the flanges of the inner member having oil ducts through which oil contained in the pockets formed by the lateral flanges passes to the adjacent surfaces of the flanges of the inner and outer members, rings interposed between the lateral flanges and the edges of the flanges of the outer member, and bolts extending from the lateral flanges and through the rings to the flanges on the inner member, the bolts limiting the movement of the rings when one member moves circumferentially with reference to the other said member.

In testimony whereof I affix my signature.

VERON DOMKE.

Copies of this patent may be obtained for five cents each, by addressing the "Commissioner of Patents, Washington, D. C."